Sept. 8, 1936.  C. E. SUMMERS  2,053,583
OSCILLATORY JOINT
Filed March 11, 1935
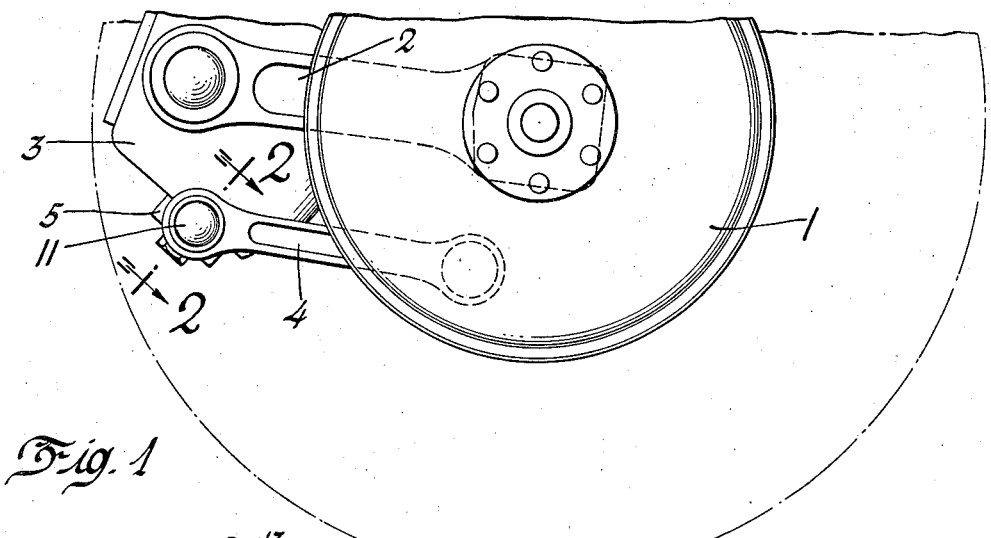
Fig. 1
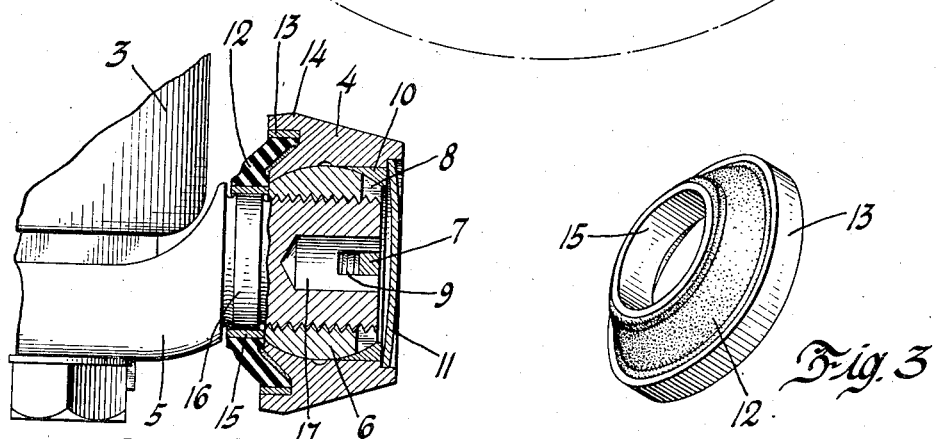
Fig. 2
Fig. 3
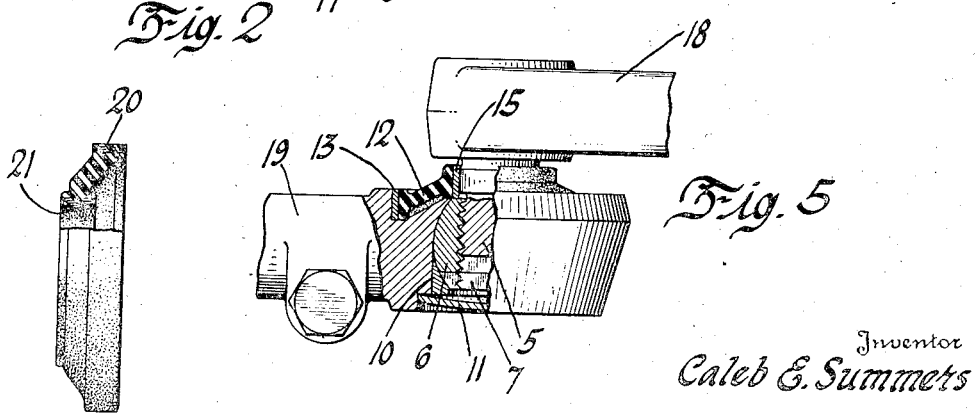
Fig. 4
Fig. 5
Inventor
Caleb E. Summers
By Blackmor, Spencer & Flint
Attorneys Patented Sept. 8, 1936

2,053,583

UNITED STATES PATENT OFFICE 2,053,583

OSCILLATORY JOINT

Caleb E. Summers, Pontiac, Mich., assignor to General Motors Corporation, Detroit, Mich., a corporation of Delaware Application March 11, 1935, Serial No. 10,373

2 Claims. (Cl. 287—90)

For the proper operation of motor vehicles, as well as other machinery, constant attention must be given to lubrication of moving parts. The lubricant supply needs replenishment from time to time, not because the lubricant wears out but because of loss and contamination. With this in mind the present invention contemplates the provision of an improved oscillatory joint which is permanently sealed to retain lubricant and exclude dirt and moisture.

For a better understanding of the invention reference is made to the accompanying drawing, wherein Figure 1 is a fragmentary view showing a well known type of independent wheel suspension for motor vehicles which includes a swinging radius rod; Figure 2 is a sectional view taken on line 2—2 of Figure 1 to illustrate the application of the invention to the radius rod joint; Figure 3 is a detail perspective view showing the flexible seal associated with the joint in Figure 2; Figure 4 is a detail view partly in section of a modified seal, and Figure 5 shows the application of the joint to a steering gear drag link connection.

In the drawing the numeral 1 indicates the brake drum assembly of a road wheel which is supported by an arm 2 mounted at one end on a rock shaft extending through the wall of a housing 3 that encloses a load supporting spring against which the arm 2 acts. A radius rod 4 is pivotally connected at opposite ends to the housing 3 and brake drum assembly 1. The pivotal connection at each end of the radius rod may be that shown in Figure 2 and which is of the ball and socket type.

The ball or inner member of the joint includes a stud 5 mounted on the housing 3 and projected into the terminal eye of the rod 4, where it is threaded for adjustably locating a bearing ring 6 having a parti-spherical peripheral surface. The opening through the eye of the lever 4 is cylindrical for approximately half its length and then flares inwardly at the inner end to provide a parti-spherical seat for the ring 6.

To hold the ring and stud in adjusted position a key or pin 7 is fitted into alined slots in the two parts. The ring is preferably provided with two or more sets of diametrical slots 8 in angular relation to each other, in any of which the pin may be fitted after a proper adjustment has been made, while the stud 5 is provided with a single transverse slot indicated at 9.

Nested within the cylindrical portion of the apertured eye is a ring 10, which has a concave inner surface for cooperation with the inwardly flared portion of the aperture to provide the seat for the ball member received therebetween. At its outer end the central opening through the arm 4 is enlarged or counterbored for seating the expansion plug or closure member 11 which hermetically seals the outer end of the opening.

The inner end of the opening is sealed by a flexible closure device which may be in the form of a soft rubber ring 12 surrounding the stud 5 and having its inner and outer margins tightly embracing or fixed relatively to the inner and outer members, respectively. As shown in the drawing the periphery of the annular ring 12 is bonded to a metal ring 13, having a press fit on the overhanging seat 14 and extending within an annular recess formed in the member 4, while the inner margin of the rubber annulus is bonded to the metal ring 15, having a press fit on a raised rib or seat 16, carried by the stud 5.

In assembling the parts the outer metal ring 13 of the rubber seal unit is first press fitted into the recess of the rod 4 and the rod applied to the stud 5. From the opposite side of the opening, the ring 6 is introduced and threadedly engaged with the stud. The cross slots 8 in the ring permit the use of a suitable tool to facilitate the threading of the ring and in this threading operation the remote end of the ring 6 engages the ring 15 of the seal and presses it on the rib 16 to insure a snug and fixed fit.

After insertion of the locking pin or key 7 in the alined slots 8 and 9, followed by the ring 10, the joint is packed with oil, grease or other lubricant, and the expansion plug 11 is secured in place. To increase the lubricant capacity of the joint the stud 5 may be hollowed out as shown at 17.

Thus the plug 11 seals the outer end of the joint, while the flexible wall 12, together with the press fitted rings 13 and 15, seals the inner end of the joint, any relative movement being accommodated by the deformation of the flexible member 12.

Similar applications of this joint and seal may be made to connections of various kinds having moving parts where the oscillatory motion is of a limited angle. Spring shackles and steering gear joints are mentioned by way of example, and the drawing shows in Figure 5 the application of the invention to a steering gear joint where the numeral 18 indicates a pitman arm and the numeral 19 a drag link interconnected by the joint previously described. Inasmuch as the joint parts are essentially the same as heretofore described the same reference numerals are applied thereto.

As regards the flexible seal it will be understood that this is not limited in use to a particular type of ball and socket joint and that it will be found adaptable for use with any joint which has an angular movement of less than approximately 100° and/or movement in other directions of less than approximately 20°. A greater degree of relative movement may be provided in the event the space is restricted by providing the wall with corrugations or folds. Its manufacture will be quite simple in that it can be readily molded of rubber, duprene or other suitable elastic and non-permeable material and the metal rings may be easily bonded thereto by vulcanization. To facilitate a vulcanized bond the metal rings may be formed of brass or if other metal is found more desirable, then brass plating of the metal will give good adhesion.

In lieu of the use of metal rings the rubber itself may have embedded or molded therein stiffening cords 20 and 21 in the inner and outer marginal portions thereof as illustrated in Figure 4, or alternatively, these marginal portions may be made of relatively hard rubber, the only requirement being that the marginal portion be fitted tightly enough to prevent rotational movement or slippage. In some cases the rubber annulus may be vulcanized directly to the relatively movable parts. In any event the flexible wall accommodates movement in all directions and effectually seals the joint to keep water or abrasives away from the bearing surfaces, and retain the lubricant for an indefinite period. In this connection it should be pointed out that the lubricant used should not be harmful to the material of the seal. Where rubber is employed castor oil is found suitable as a lubricant and is not injurious to the rubber. Where duprene or other more resistance substances are used mineral oils or greases are permissible.

Since it is well recognized that any well designed bearing does not wear if properly lubricated and protected from grit, the practical result of the structure described is a substantially frictionless joint which remains constant in fit without wear. Without necessitating attention, a long period of usefulness is obtained.

I claim:

1. In an oscillating joint, an outer member having a recess flared inwardly toward one end to provide a spherical seat, a ball member within the recess bearing on said seat and having a central threaded aperture, an inner member threadedly engaged with said ball member, a key fitting alined slots in the ball and inner members, a ring received within the other end of the recess of the outer member and provided with an inner spherical surface bearing on the ball member and cooperating with said flared surface to afford a socket, a permanently fitted plug closing said recess and holding said ring and said key against displacement and a closure member for the flared end of the recess, comprising a flexible annular ring secured to both the inner and outer members.

2. In an oscillating joint, a ball comprising a threaded stud and a ring threaded on the stud and provided with a spherical outer surface, a socket comprising a pair of members nested one within the other and provided interiorly thereof with cooperating spherical surfaces to receive the ball therebetween, means to hold the parts in assembly with the stud projecting beyond one end of the socket, said means including a pin fitted through the opposite end of the socket in alined slots in the stud and ring and an expansion plug closing said end of the socket to hold the pin in place and said members together, and a flexible diaphragm closing the other end of the socket and fixed to one member of the socket and to the stud of the ball.

CALEB E. SUMMERS.